(12) United States Patent
Kaneyasu et al.

(10) Patent No.: US 8,205,313 B2
(45) Date of Patent: Jun. 26, 2012

(54) STRUCTURE FOR ATTACHING VIBRATION INSULATING MEMBER

(75) Inventors: Yoshikazu Kaneyasu, Saitama (JP); Taiki Yanase, Saitama (JP); Nobuyuki Kosaka, Saitama (JP); Takeshi Chiba, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 961 days.

(21) Appl. No.: 12/231,990

(22) Filed: Sep. 8, 2008

(65) Prior Publication Data

US 2009/0077785 A1   Mar. 26, 2009

(30) Foreign Application Priority Data

Sep. 10, 2007   (JP) .................................. 2007-234798

(51) Int. Cl.
*B23P 11/00* (2006.01)
(52) U.S. Cl. .......................................... 29/428; 188/268
(58) Field of Classification Search .................... 29/428; 188/268
See application file for complete search history.

(56) References Cited

U.S. PATENT DOCUMENTS

| | | | |
|---|---|---|---|
| 4,621,822 A | 11/1986 | Knochelmann et al. | |
| 7,658,414 B2 * | 2/2010 | Watanabe et al. | 280/834 |
| 7,938,481 B2 * | 5/2011 | Kobayashi et al. | 296/204 |
| 2004/0200356 A1 * | 10/2004 | Kuperus | 96/147 |
| 2009/0101220 A1 * | 4/2009 | Mundy | 137/575 |

FOREIGN PATENT DOCUMENTS

| | | |
|---|---|---|
| DE | 1 952 708 U | 12/1966 |
| EP | 1 564 058 A1 | 8/2005 |
| GB | 2 160 834 A | 1/1986 |
| GB | 2 415 479 A | 12/2005 |
| JP | S 38-25734 | 12/1963 |
| JP | 57-205227 | 12/1982 |
| JP | S61-61434 | 4/1986 |
| JP | S62-16303 | 2/1987 |
| JP | S 62-172626 | 11/1987 |
| JP | S63-124524 | 8/1988 |
| JP | 2003-214470 A | 7/2003 |
| JP | 2003214470 A * | 7/2003 |
| JP | 2006-192947 | 7/2006 |

* cited by examiner

*Primary Examiner* — Derris Banks
*Assistant Examiner* — Azm Parvez
(74) *Attorney, Agent, or Firm* — Carrier Blackman & Associates, P.C.; William D. Blackman; Joseph P. Carrier

(57) ABSTRACT

There is provided a structure of a vibration insulating member for firmly fixing the member between a fuel tank mounted on a vehicle body by means of a tank band and the vehicle body. The vibration insulating member includes an engaging protrusion that is fixed to a fixing hole that is made through the vehicle body in a direction orthogonal to a direction in which the tank band is fastened.

3 Claims, 5 Drawing Sheets

STRUCTURE FOR ATTACHING VIBRATION INSULATING MEMBER

CROSS REFERENCE TO RELATED APPLICATIONS

This application claims the foreign priority benefit under Title 35, United States Code, §119 (a)-(d) of Japanese Patent Application No. 2007-234798, filed on Sep. 10, 2007 in the Japan Patent Office, the disclosure of which is herein incorporated by reference in its entirety.

BACKGROUND OF THE INVENTION

1. Field of the Invention

The present invention relates to a structure of a vibration insulating member attached to be interposed between a vehicle-mounted fuel tank mounted on a vehicle body by a tank band for example and the vehicle body.

2. Related Art

Heretofore, a vehicle-mounted fuel tank is secured to a vehicle body by bolting a metallic tank band to a part of the vehicle body such as a cross member. Then, a vibration insulating member made of rubber is interposed between the fuel tank and the vehicle body to suppress noises and vibrations caused by waving fuel within the fuel tank from being transmitted to the vehicle body as disclosed in Japanese Patent Application Laid-Open No. 2006-192947A for example (paragraphs [0020] and [0022], FIGS. 1 through 4).

The vibration insulating member disclosed in JP2006-192947A is made of cushion rubber and absorbs, vibrations by fixing fourth and fifth projections formed on a lower face portion of the rubber to the fuel tank with an adhesive and by abutting first and second projections formed on an upper face portion of the rubber and having a split groove against a floor panel of the vehicle body.

Although such cushion rubber has had no problem in securing the fuel tank to the vehicle body by the band from the underneath of the tank after fixing the cushion rubber to the upper face of the tank because the cushion rubber is fixed to the fuel tank by means of the adhesive, the cushion rubber has had a problem that it readily falls away when a load in a shearing direction is applied.

The fuel tank is disposed between right and left side frames or between front and rear cross members by leaving predetermined gaps from them so that no vibration of the tank is transmitted to the vehicle body during traveling and no cushion rubber is attached to side surfaces of the tank in the front and rear and right and left directions. Therefore, although it has been possible to readily position the fuel tank in up and down directions (vertical direction) by the cushion rubber in mounting the fuel tank on the vehicle body, it has been difficult to position the fuel tank in terms of the front and rear and right and left directions of the vehicle body. It has also caused a problem that a capacity of the tank cannot be increased by narrowing the gaps between the tank and the side frames or the cross members in the front and rear and right and left directions.

Although it has been conceivable to provide the cushion rubber between the side surface of the tank and the vehicle body, the cushion rubber might possibly fall away in securing the tank if the cushion rubber is adhered on the side surface of the tank. It has been then conceivable to form the cushion rubber so that it engages with a fixing hole 210 as shown in FIG. 6. Because the hole is necessary in this case, a cushion rubber 100 is attached on the side of a vehicle body 200.

FIG. 6 is an enlarged section view showing a prior art structure of the vibration insulating member for attaching it to the fuel tank arranged in accordance to the concept described above.

The cushion rubber 100 shown in FIG. 6 is the vibration insulating member for the fuel tank that solves the aforementioned problem. The cushion rubber 100 having a seat portion 110 that butts a fuel tank 300 and an anchoring protrusion 120 that engages with the fixing hole 210 made through a securing region of the vehicle body 200 are formed into a single-piece by rubber, i.e., a soft material. A projection 130 that crimps the vehicle body 200 is formed around an outer periphery of the seat portion 110. The anchoring protrusion 120 is provided with an anchoring hook 140 that is anchored to an opening edge of the fixing hole 210.

The cushion rubber 100 constructed as described above is attached to the vehicle body 200 with the projection 130 crimping the surface of the attachment region of the vehicle body 200 and with the anchoring hook 140 butted and anchored to the opening edge of the fixing hole 210.

The vibration insulating member formed and attached as shown in FIG. 6 is readily deformed because the anchoring protrusion 120 that engages with the fixing hole 210 is formed integrally with the seat portion 110 that absorbs vibrations with the rubber, i.e., the soft material. Therefore, the attachment structure of the vibration insulating member has had a problem that anchoring force (removal bearing force) of the anchoring protrusion 120 for anchoring to the fixing hole 210 is small and the anchoring protrusion 120 falls away from the fixing hole 210 when the fuel tank 300 deforms or when external force in a lateral direction (thrust direction) is applied.

There has been also a problem that although hardening of the whole rubber may increase the anchoring force, it also increases insertion force required in inserting the anchoring protrusion and worsens workability and the vibration insulating quality of the vibration insulating member.

The prior art cushion rubber 100 has had also a problem that the cushion rubber cannot be utilized as a guide in mounting the fuel tank 300 because the force of the anchoring protrusion 120 for anchoring to the edge of the fixing hole 210 is weak and the cushion rubber 100 falls away in mounting the fuel tank 300 on the vehicle by utilizing the cushion rubber 100 as the guide.

Accordingly, in order to solve the aforementioned problems, the present invention seeks to provide a structure of a vibration insulating member that may be readily and firmly fixed to a vehicle body and may be used as a positioning member in mounting a fuel tank to a vehicle.

SUMMARY OF THE INVENTION

In order to solve the aforementioned problems, according to a first aspect of the invention, a vibration insulating member, interposed between a fuel tank that is mounted on a vehicle body by means of a tank band and the vehicle body, includes an engaging protrusion that is engaged to a fixing hole that is made through the vehicle body in a direction orthogonal to a direction in which the fuel tank is fastened.

According to the first aspect of the invention described above, the fixing hole is made through the vehicle body in the direction orthogonal to the direction in which the tank band is fastened and the vibration insulating member is attached to the vehicle body by inserting the engaging protrusion into the fixing hole. Therefore, the engaging protrusion of the vibration insulating member is provided in the direction orthogonal to the direction in which the fuel tank is fastened to the vehicle body, i.e., in the lateral direction (thrust direction) such as front and rear directions in which the fuel tank may possibly move.

Still more, because the vibration insulating member is disposed in parallel with a direction of a load applied to the fuel tank and the vibration insulating member by fuel within the fuel tank that moves in the front and rear directions within the fuel tank when the vehicle suddenly stops, no force of pulling out the vibration insulating member acts on the engaging protrusion. That is, the vibration insulating member may be disposed in the direction in which the engaging protrusion is not pulled out.

As a result, because the vibration insulating member can accept the load in the front and rear directions, removal bearing force of the engaging protrusion is enhanced and the engaging protrusion is firmly anchored to the vehicle body. Therefore, not only that the vibration insulating member may be readily and firmly anchored to the vehicle body, it may be also used as a positioning member (as a guide and a positioning stopper) in mounting the fuel tank on the vehicle body.

According to a second aspect of the invention, the vibration insulating member as described in the first aspect further includes an attachment member formed integrally with the engaging protrusion and a cushion member having a through hole through which the engaging protrusion is inserted. The attachment member has supporting portions, each of which projects in a direction orthogonal to the engaging protrusion to support the cushion member.

According to the second aspect of the invention described above, the vibration insulating member composed of the two parts of the attachment member and the cushion member sandwiches the cushion member between the supporting portion thereof and the vehicle body to which the engaging protrusion is anchored. Therefore, the cushion member is firmly held by the attachment member without separating and falling away from the attachment member.

According to a third aspect of the vibration insulating member of the invention, the cushion member has stepped portions, each of which engages with the supporting portion of the attachment member.

According to the third aspect of the invention described above, because the cushion member has the stepped portions, each of which engages with the supporting portion, the vibration insulating member may be attached to the vehicle body in a state when the cushion member is integrally assembled with the attachment member by engaging the supporting portions with the stepped portions. Thereby, even if the vibration insulating member attached to the vehicle body receives such force that turns over an outer peripheral part of the cushion member, the supporting portions of the attachment member presses the stepped portions toward the vehicle body side, suppressing the cushion member from being deformed and dislocated and can keep the state in which the vibration insulating member is closely attached to the attachment surface of the vehicle body.

As a result, it becomes possible to enhance the removal bearing force that prevents the engaging protrusion from been disengaged from the fixing hole of the vehicle body.

According to a fourth aspect of the invention, preferably the attachment member has an anchor portion that is anchored by an opening edge of the fixing hole when the engaging protrusion is inserted into the through hole of the cushion member and the fixing hole of the vehicle body.

According to the fourth aspect of the invention described above, the anchoring portion may be anchored to the opening edge of the fixing hole by a so-called snap-fit by pressing the engaging protrusion into the fixing hole after inserting the engaging protrusion into the through hole of the cushion member and the fixing hole. Due to that, the attachment member and the cushion member may be fixed to the vehicle body readily by one-touch, simplifying the works for attaching the vibration insulating member to the vehicle body.

According to a fifth aspect of the invention, preferably the supporting portion is formed to project from a base portion of the engaging protrusion toward a hem portion of each of the projections of the cushion member.

According to the fifth aspect of the invention described above, because the cushion member has the projections that butt the fuel tank, the cushion member can absorb vibrations of the fuel tank and the attachment member. Still more, because each of the supporting portions of the attachment member is formed to project from around the base portion of the engaging protrusion toward the hem portion of the projection of the cushion member, the supporting portion can support the projection and suppress the projection from being deformed or dislocated so as to tilt by being pressed by fastening force in assembling the vibration insulating member. The supporting portion of the attachment member can also suppress the cushion member from being deformed as if it is turned over by receiving a load in the lateral direction (thrust direction). Because it suppresses the load in the lateral direction from being applied to the engaging protrusion, it is possible to enhance the removal bearing force that prevents the engaging protrusion from being disengaged from the fixing hole of the vehicle body.

According to a sixth aspect of the invention, preferably the respective supporting portions of the attachment member are formed to be a plurality of projecting pieces that project radially from a region around the base portion of the engaging protrusion and the stepped portions of the cushion member are also formed radially from a region around the through hole to fit with the plurality of projecting pieces of the attachment member.

According to the sixth aspect of the invention described above, the projecting pieces and the stepped portions are both formed to project radially and to engage with each other, so that the projecting pieces can suppress the cushion member from being deformed as if it is peeled off by a load in the lateral direction (thrust direction) in the front and rear and right and left directions.

According to a seventh aspect of the invention, preferably the cushion member is made of synthetic rubber and the attachment member is made of synthetic resin harder than the cushion member.

According to the seventh aspect of the invention described above, the attachment member having the engaging protrusion inserted into the fixing hole is made of the synthetic resin harder than the cushion member, so that it becomes possible to assure a required fixing strength (removal bearing force) while reducing the force for inserting the engaging protrusion into the fixing hole.

According to an eighth aspect of the invention, a method for attaching a vibration insulating member to be interposed between a fuel tank mounted on a vehicle body by means of a tank band and the vehicle body includes steps of: assembling an attachment member having an engaging protrusion and supporting portions formed to project in a direction orthogonal to the engaging protrusion with a cushion member having a through hole, stepped portions and projections that butt the fuel tank by fitting the supporting portions respectively into the stepped portions while inserting the engaging protrusion into the through hole; attaching the vibration insulating member having the attachment member and the cushion member to a vertical portion of the vehicle body by pressing the attachment member and thereby the engaging protrusion into a fixing hole made through the vertical portion to fix and to resiliently sandwich the cushion member and the vertical portion; and lifting up the fuel tank from the underneath of the vehicle body by using the vibration insulating member as a guide.

Preferably, the engaging protrusion has an anchor portion that is anchored by an opening edge of the fixing hole when the engaging protrusion is inserted into the through hole of the cushion member and the fixing hole.

As described above, the invention provides the vibration insulating member that may used as the positioning member in mounting the fuel tank on the vehicle and that may be firmly fixed to the vehicle body.

PREFERRED EMBODIMENT OF THE INVENTION

A structure of a vibration insulating member and a method for attaching the vibration insulating member between a fuel tank and a vehicle body according to an embodiment of the invention will be explained below with reference to FIGS. 1 through 5.
<Structure of Fuel Tank>

Figure 1:
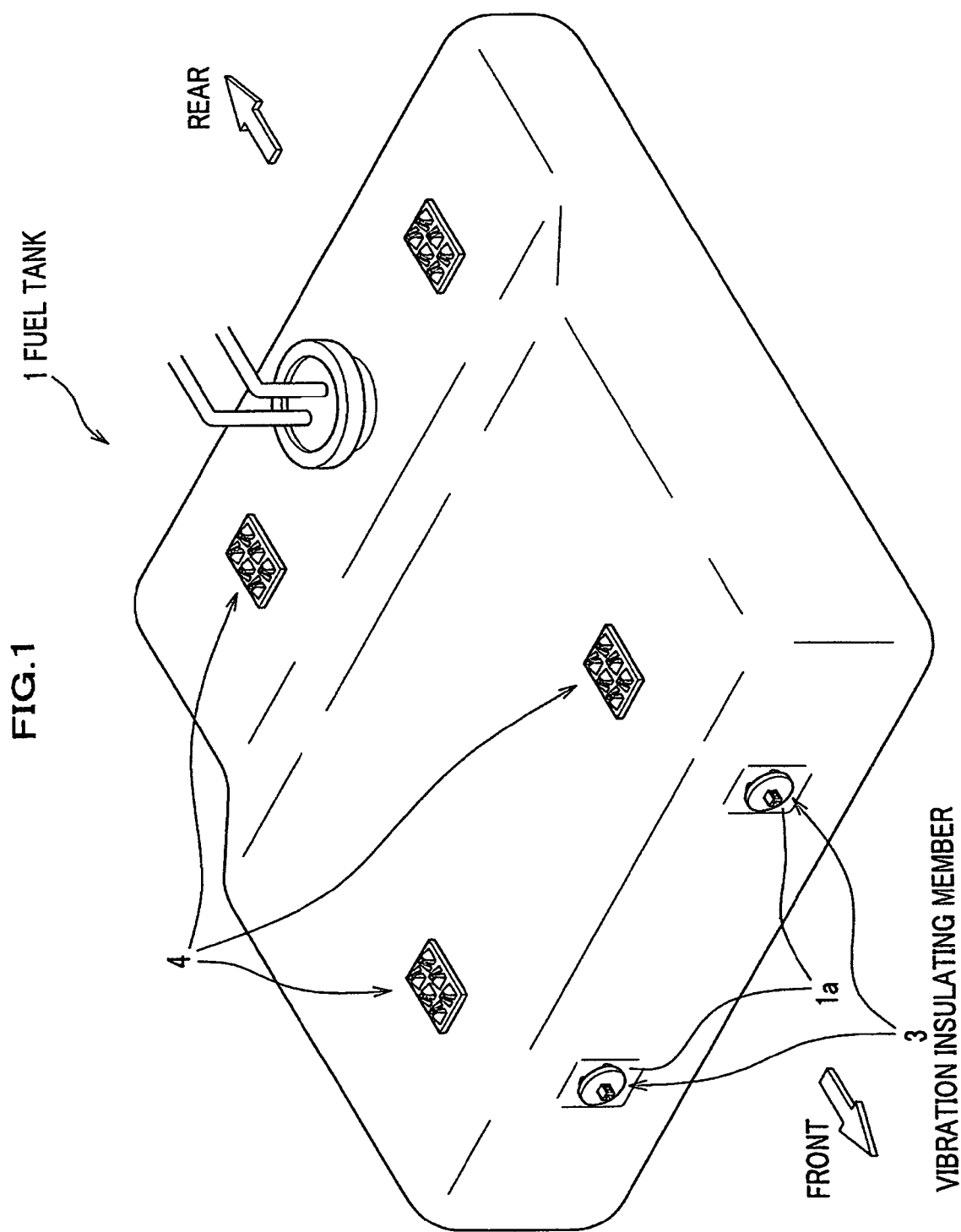
FIG. 1 is a perspective view of a fuel tank indicating positions where vibration insulating members are disposed while showing a structure of the vibration insulating members of an embodiment of the invention.
Figure 2:
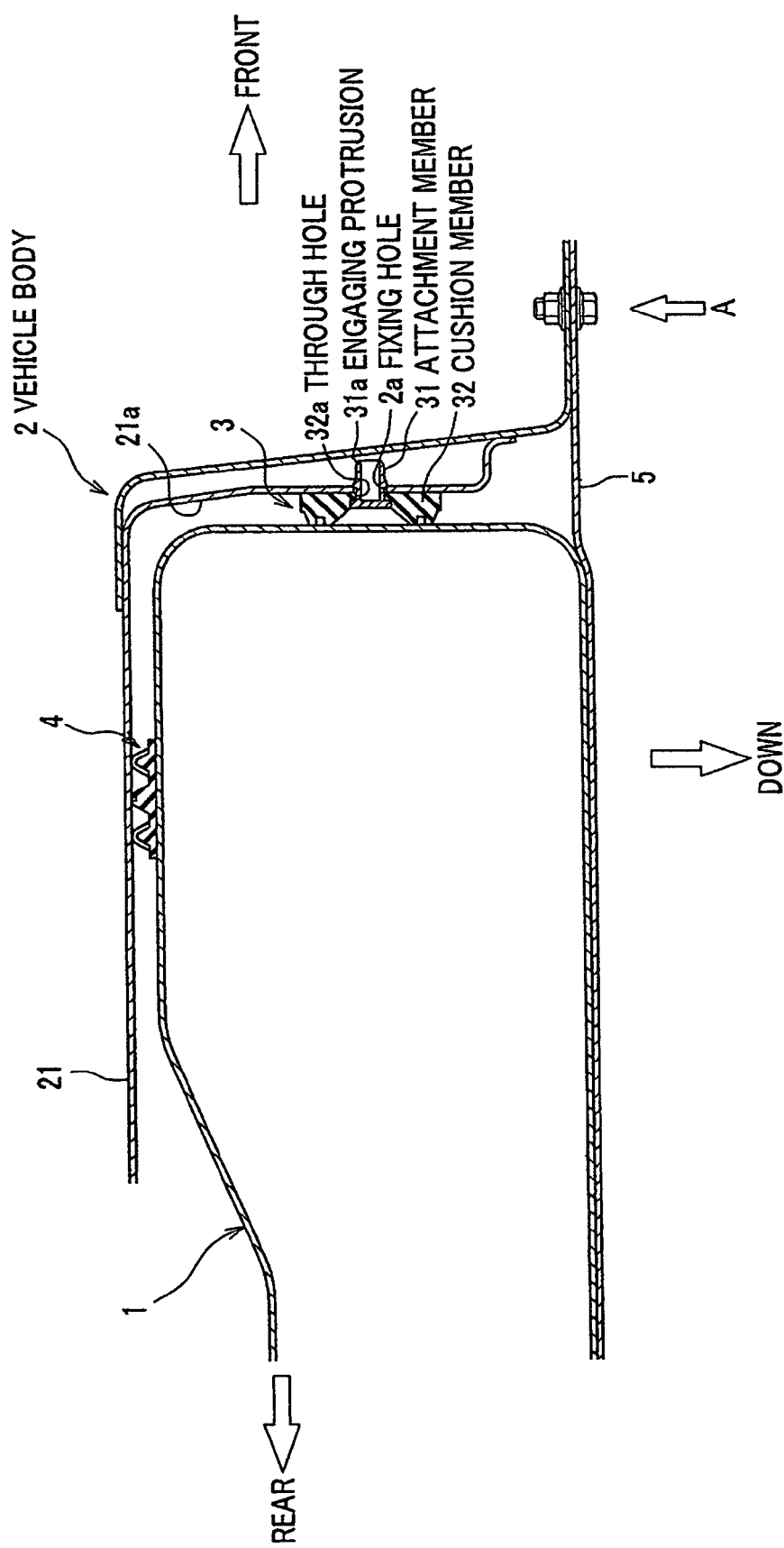
FIG. 2 is an enlarged section view of a main part of the vibration insulating members how they are attached.

The fuel tank 1 is a hollow container, made of synthetic resin or metal, for storing vehicle fuel such as gasoline, light oil and alcohol as shown in FIG. 1 and is disposed, for example, at an underside of a floor panel 21 of a vehicle body 2 as shown in FIG. 2. A fuel tank 1 is provided with a plurality of abutment faces 1a (see FIG. 1), each formed at a region facing to a vibration insulating member 3 on side surfaces of the fuel tank 1 and having a flat vertical face against which the vibration insulating member 3 abuts. The fuel tank 1 is secured to an under-floor of the vehicle body 2 by bolting a tank band 5 to the vehicle body 2 while interposing the vibration insulating members 3 and 4 between the fuel tank 1 and the vehicle body 2.
<Structure of Vehicle Body>

The vehicle body 2 is a fixed member of the vehicle to which the vibration insulating member 3 is fixed and is the floor panel 21 or a frame member such as a cross member. The vehicle body 2 is provided with a rectangular fixing hole 2a (see FIG. 4) made through in a direction crossing at a right angle (longitudinal direction) with the direction of bolting the tank band 5 (direction of an arrow A in FIG. 2).

The floor panel 21 is a member that forms a floor of the vehicle and is made of a metallic flat member such as a steel plate.

The tank band 5 is a metallic belt-like member for securing the fuel tank 1 to the vehicle body 2 and is fixed to the vehicle body 2 by means of bolts and nuts while holding the fuel tank 1.
<Structure of Vibration Insulating Member>

As shown in FIG. 1, the vibration insulating members include two kinds of members, i.e., the vibration insulating member 3 that is disposed on the side surface of the fuel tank 1 to absorb load, vibrations and noises in the lateral direction (thrust direction) (referred to as a lateral vibration insulating member hereinafter) and the vibration insulating member 4 that is disposed on an upper surface of the fuel tank 1 to absorb load, vibrations and noises in a vertical direction (radial direction) (referred to as a top vibration insulating member hereinafter).
<Structure of Lateral Vibration Insulating Member>

A pair of lateral vibration insulating members 3 is disposed on the side surface of a front side of the fuel tank 1 while leaving an appropriate distance between the two vibration insulating members as shown in FIG. 1. Note that the lateral vibration insulating members 3 that receive the load in the lateral direction (thrust direction) may be disposed in four directions, i.e., the front and rear and right and left surfaces of the fuel tank 1, respectively. The present embodiment will be explained below by exemplifying a case when the lateral vibration insulating member 3 is disposed on the vehicle body 2 to butt the front side surface of the fuel tank 1.

Figure 4:
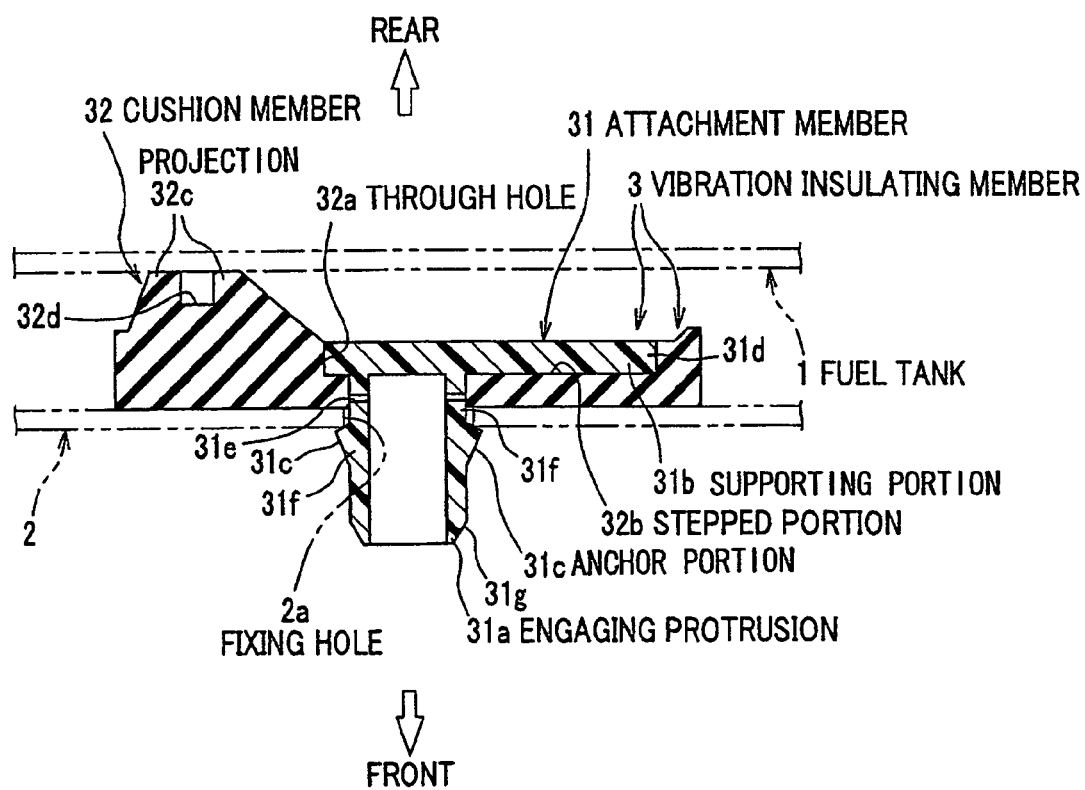
FIG. 4 is a section view seen along arrows X-X in FIG. 3.
Figure 5:
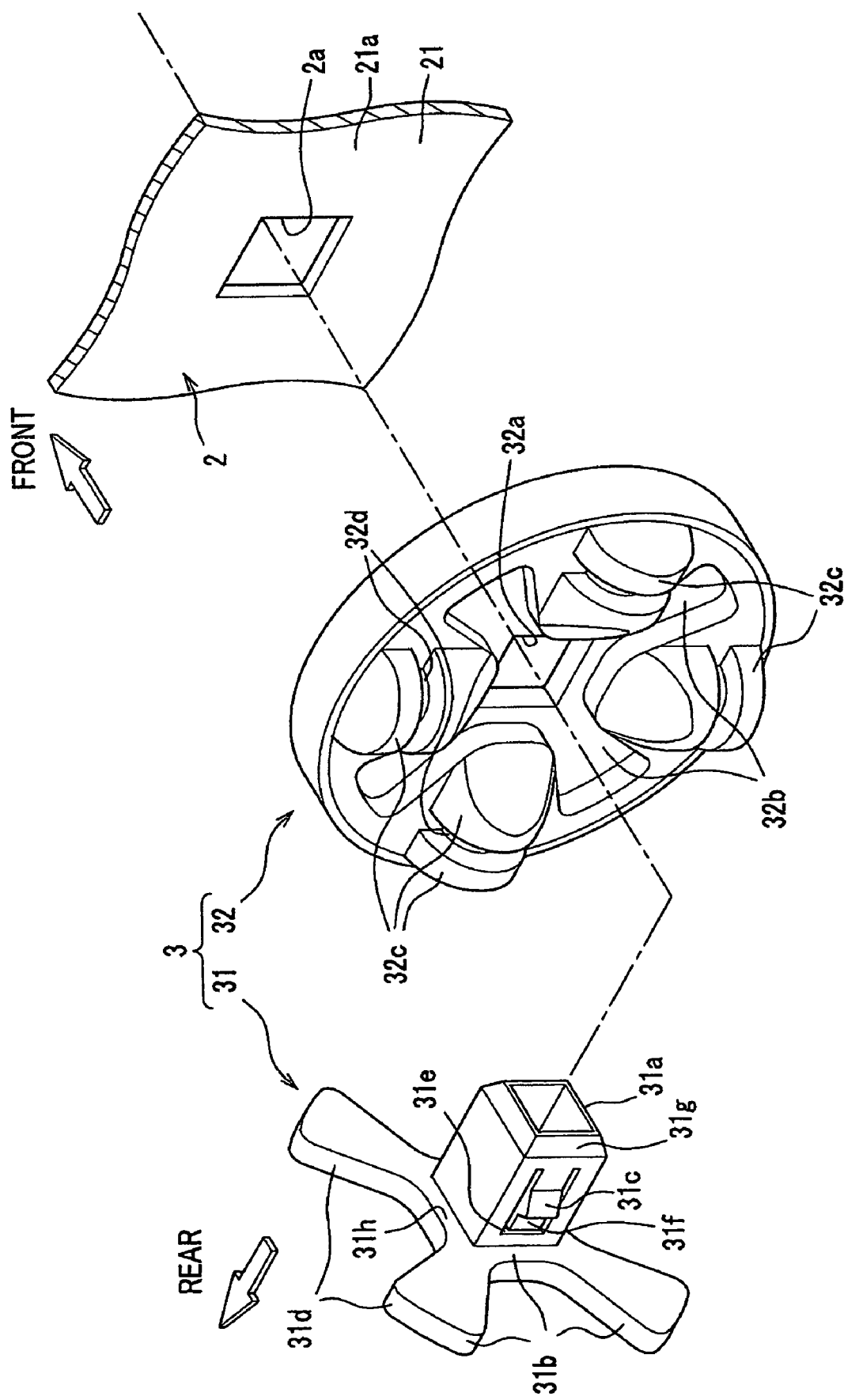
FIG. 5 is an enlarged exploded perspective view showing how the vibration insulating member is attached.
Figure 6:
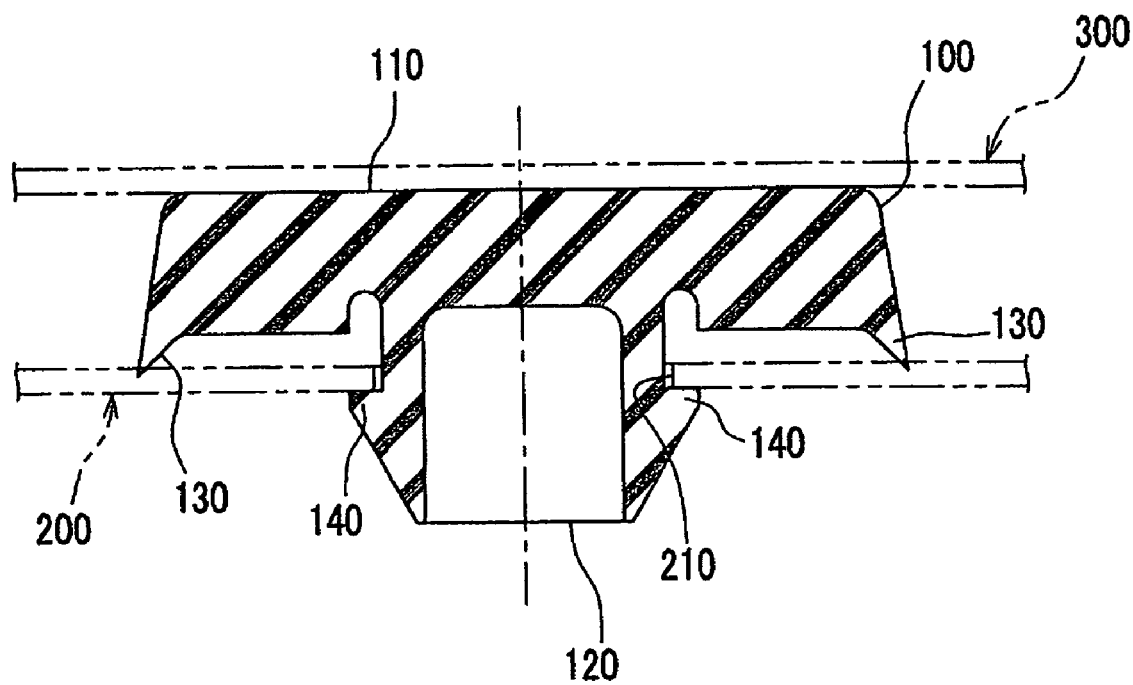
FIG. 6 is an enlarged section view showing a prior art structure of a vibration insulating member for use for a fuel tank.

As shown in FIGS. 2, 4 and 5, each of the lateral vibration insulating members 3 has an attachment member 31 integrally formed with an engaging protrusion 31a that is to be inserted into a fixing hole 2a made through a vertical portion 21a of the floor panel 21 and the like of the vehicle body 2 and a cushion member 32 having a through hole 32a through which the engaging protrusion 31a is to be inserted. That is, the lateral vibration insulating member 3 is composed of the two parts of the cushion member 32 for absorbing vibrations and the attachment member 31 for fixing the cushion member 32 to the vehicle body 2.
<Structure of Attachment Member>

As shown in FIG. 5, the attachment member 31 is a clip-like member for removably fixing the cushion member 32 to the vehicle body 2 and is made of synthetic resin. Formed integrally as the attachment member 31 are the engaging protrusion 31a formed substantially into a shape of a rectangular cylinder, supporting portions 31b that project from a base portion of the engaging protrusion 31a in directions orthogonal to the engaging protrusion 31a to support the cushion member 32 and anchor portions 31c that are anchored to an opening edge of the fixing hole 2a. The attachment member 31 is made of the synthetic resin harder than the cushion member 32.

As shown in FIGS. 4 and 5, the engaging protrusion 31a is fitted into the rectangular through hole 32a made through a center part of the cushion member 32 and the fixing hole 2a of the vehicle body 2 to support the cushion member 32 so as not to be turned with respect to the vehicle body 2. The engaging protrusion 31a is provided with the anchor portion 31c, a slit groove 31e formed substantially into a letter "U" around the anchor portion 31c to give an elasticity to the anchor portion 31c, an elastic piece 31f formed by the slit groove 31e and a chamfered inclined face 31g, formed at a distal end of the engaging protrusion 31a.

The supporting portion 31b is a region equivalent to a head of the attachment member 31 and presses the cushion member 32 so that the cushion member 32 closely contacts with an attachment face of the vehicle body 2 when the cushion member 32 is attached to the vehicle body 2 by inserting the engaging protrusion 31a through the through hole 32a and the fixing hole 2a. The supporting portion 31b is provided with a flange portion 31h formed around the base portion of the engaging protrusion 31a and a plurality of projecting pieces 31d projecting toward the outside further from the flange portion 31h. The supporting portion 31b is formed to project from the region around the base portion of the engaging protrusion 31a toward a hem of the projection 32c so that the supporting portion 31b is disposed between the projections 32c when the attachment member 31 is combined with the cushion member 32.

Each of the projecting pieces 31d prevents an outer part of the cushion member 32 attached to the vehicle body 2 from being deformed to be turned outward by external force and also suppresses the projection 32c from being bent by the external force. The projecting pieces 31d include four tongue pieces for example formed into a shape of a propeller (into a letter of X) in a radial direction from around the rectangular base portion of the engaging protrusion 31a and are engaged with stepped portions 32b formed in the cushion member 32.

The anchor portion 31c is formed into a shape of an anchor so that the engaging protrusion 31a is anchored to the opening edge of the fixing hole 2a when the engaging protrusion 31a is inserted through the through hole 32a of the cushion member 32 and the fixing hole 2a of the vehicle body 2. The anchor portions 31c are formed on right and left side surfaces of the engaging protrusion 31a respectively and substantially into a shape of a triangular projection in a plan view.

The elastic piece 31f prevents the anchor portion 31c from being disengaged from the fixing hole 2a by elastically abutting a slope of the anchor portion 31c with the edge of the fixing hole 2a when the through hole 32a and the fixing hole 2a are interposed between the supporting portion 31b and the anchor portion 31c. The elastic pieces 31f are formed on the right and left side surfaces of the engaging protrusion 31a, respectively.

The slit groove 31e is formed approximately into the letter U around the anchor portion 31c to form the elastic piece 31f, to give elastic force (spring force) to the elastic piece 31f and to press the anchor portion 31c to the edge of the fixing hole 2a without loose.

<Structure of Cushion Member>

As shown in FIG. 5, the cushion member 32 is a member for absorbing load, vibrations and noises caused by the fuel tank 1 and is formed approximately into a shape of a disc by any one of synthetic rubber, a soft synthetic resin or resin foam for example. The cushion member 32 includes the through hole 32a, the stepped portions 32b that engage with the supporting portions 31b, projections 32c that butt the fuel tank 1 and a slit groove 32d formed on each projection 32c. The cushion member 32 has the stepped portions 32b and the slit grooves 32d on a rear side thereof abutting against the fuel tank 1 and a flat plane or an irregular plane on a front side thereof abutting against the vehicle body 2.

The through hole 32a is a hole through which the engaging protrusion 31a is inserted and is formed squarely at a center part of the cushion member 32 to conform to a shape of the engaging protrusion 31a whose cross-section is square to prevent the cushion member 32 from being turned.

The stepped portions 32b is a dent into which the plurality of projecting pieces 31d engages and the whole supporting portion 31b fits in as one plane and is formed into the shape of X extending radially from a peripheral region of the through hole 32a to the outside in conformity with the projecting pieces 31d. The stepped portion 32b is formed to be able to suppress the projection 32c from being deformed by external force by supporting a side wall of the cushion member 32 that abuts against the supporting portion 31b and a side wall of the cushion member 32 continuing to a hem portion of the projection 32c disposed between the respective projecting pieces 31d with the supporting portion 31b by fitting the attachment member 31 into the cushion member 32.

Each projection 32c is formed substantially into a convex shape projecting out of the disc plane of the cushion member 32 in a region where the projection 32c butts an outer surface (the front side surface) of the fuel tank 1 and where the load such as vibrations, impacts and external force is applied as shown in FIG. 5. The projection 32c has the slit groove 32d formed around a center peripheral surface thereof.

The slit groove 32d is formed so that the edge of the projection 32c readily deforms to give an appropriate resilience and to improve vibration absorbability thereof. The slit groove 32d is a groove whose cross-section is substantially a circular arc along the peripheral surface of the projection 32c and is formed to split the projection 32c.

<Structure of Top Vibration Insulating Member>

Each of the top vibration insulating members 4 is formed of cushion rubber, having a plurality of convex projections, and is fixed at each of four places in the front and rear and right and left directions of the upper surface of the fuel tank 1 by an adhesive as shown in FIG. 1. The top vibration insulating member 4 is formed of one substantially thick plate-like part made of synthetic rubber. Note that the same one with the lateral vibration insulating member 3 may be used as the top vibration insulating member 4.

<Action>

Next, an action of the attachment structure of the vibration insulating member 3 of the embodiment of the invention will be explained together with an attachment procedure with reference to FIGS. 1 through 5.

At first, the vibration insulating members 4 are fixed at four places of front and rear and right and left of the upper surface of the fuel tank 1 as shown in FIG. 1.

Next, the attachment member 31 is assembled and integrated with the cushion member 32 as shown in FIG. 5. In this case, the attachment member 31 is attached to the cushion member 32 by fitting the four projecting pieces 31d respectively into stepped portions 32b while inserting the engaging protrusion 31a into the through hole 32a.

Because the anchor portion 31c is anchored in abutment by the through hole 32a, the attachment member 31 assembled with the cushion member 32 as described above will not be disassembled from the cushion member 32 even if the both members are stored in the assembled state. Accordingly, the parts control may be made readily.

Next, the vibration insulating members 3 (i.e., the attachment member 31 and the cushion member 32) are attached to a plurality of places of the vertical portion 21a such as the floor panel 21 where the fuel tank 1 is disposed as shown in FIG. 5. In this case, the attachment member 31 is pressed, and thereby to press the engaging protrusion 31a into the fixing hole 2a.

Then, the anchor portion 31c enters the fixing hole 2a while slidably contacting with the edge of the fixing hole 2a as shown in FIG. 4, so that the elastic piece 31f deflects inward, causing resilient force, and the slope of the convex anchor portion 31c is anchored by the fixing hole 2a while being pressed to the fixing hole 2a. Therefore, the vibration insulating member 3 is firmly fixed to the vehicle body 2 without loose because the supporting portion 31b and the anchor portion 31c of the attachment member 31 resiliently sandwich the cushion member 32 and the floor panel 21.

Accordingly, this structure suppresses the vibration insulating members 3 from falling away from the vehicle body 2 due to vibrations of the vehicle or external force. Thus, the lateral vibration insulating member 3 may be attached to the vehicle body 2 readily in a manner so-called snap-fit by the anchor portion 31c and composes the cushion member 32 for the fuel tank 1 while assuring the appropriate force required in inserting the anchor portion 31c into the fixing hole 2a and a fixation strength (removal bearing force).

Next, the fuel tank 1 is lifted up from the underneath of the vehicle body 2 until when the vibration insulating members 4 butt the floor panel 21 by using the vibration insulating members 3 as guides. This arrangement allows the workability of the operation for mounting the fuel tank 1 on the vehicle body 2 to be improved because the vibration insulating members 3 and 4 may be used as positioning stoppers for guiding and disposing the fuel tank 1 at its predetermined position.

Then, the fuel tank 1 may be secured to the vehicle body 2 by bolting the tank band 5 to the vehicle body 2 while holding the bottom surface of the fuel tank 1.

Figure 3:
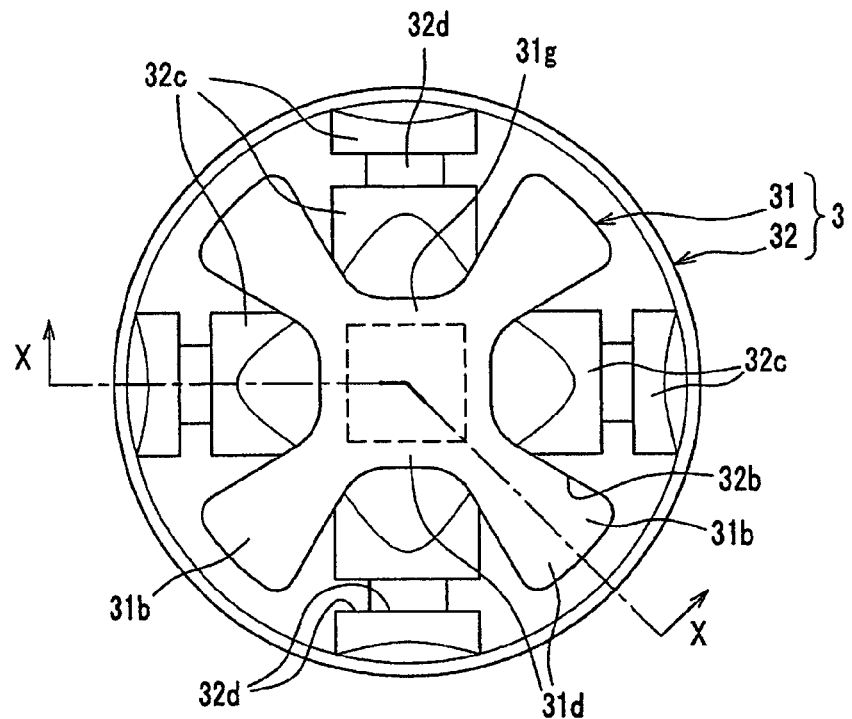
FIG. 3 is an enlarged front view of one of the vibration insulating members.

Even if a vertical load in a direction of a seating surface (in the direction of the arrow A in FIG. 2) is applied to the lateral vibration insulating member 3 when the tank band 5 is bolted to the vehicle body 2 for example, the attachment member 31 can accept the load with the projecting pieces (supporting portions 31b) 31d formed of the synthetic resin into the shape of X and engaging with the stepped portions 32b of the cushion member 32 made of the soft material such as rubber as shown in FIGS. 3 through 5. Therefore, it is possible to suppress the cushion member 32 from being otherwise deformed as if it is peeled off by the load in the vertical direction (in the direction of the arrow A in FIG. 2).

When the vehicle is braked suddenly during traveling for example, the fuel tank 1 secured to the vehicle body 2 as described above causes noises, vibrations and inertia force because the fuel within the fuel tank 1 waves by moving forward.

The cushion member 32 of the lateral vibration insulating members 3 disposed on the front side of the fuel tank 1 absorbs and damps such noises, vibrations and inertia force before they are transmitted to the vehicle body 2.

In this case, because the vehicle body 2 has the lateral vibration insulating members 3 with the anchor portion 31c of the engaging protrusion 31a anchored to the fixing hole 2a made in the direction orthogonal to the direction of bolting the tank band 5 (the direction A), the lateral vibration insulating member 3 can take and moderate the inertia force (load in the front and rear direction) at this time. Then, because the direction of the inertia force is the same with the direction in which the engaging protrusion 31a protrudes and no load in the rearward direction is applied to the attachment member 31, the removal bearing force of the attachment member 31 increases and the attachment member 31 is anchored to the fixing hole 2a of the vehicle body 2 firmly, i.e., the attachment member 31 will not fall away.

Therefore, even if each of the lateral vibration insulating members 3 is composed of the two parts of the attachment member 31 and the cushion member 32, the supporting portion 31b of the attachment member 31 and the anchor portion 31c of the engaging protrusion 31a keep the state of sandwiching the cushion member 32 and the floor panel 21 and can prevent the cushion member 32 from separating and falling away from the attachment member 31.

Still more, because the projection 32c of the cushion member 32 made of the soft material such as rubber and abutting against the fuel tank 1 is supported by the supporting portion 31b formed to project from the peripheral region of the base portion of the engaging protrusion 31a to the hem portion of the projection 32c, the supporting portion 31b can suppress the projection 32c from being bent and deformed so as to be tilted by being pressed by the fuel tank 1.

The supporting portion 31b can also suppress the cushion member 32 from being deformed as if it is turned over by receiving the load in the vertical direction. This arrangement suppresses the load in the vertical direction from being applied to the engaging protrusion 31a, so that the removal bearing force for preventing the engaging protrusion 31a from being disengaged from the fixing hole 2a of the vehicle body 2 may be enhanced.

<Exemplary Modification>

It is noted that the invention is not limited to the embodiment described above and may be improved or modified variously within a scope of a technological thought thereof. It is also needless to say that those improvement and modification belong to the invention.

For example, although the case of providing the lateral vibration insulating member 3 between the front side surface of the fuel tank 1 and the vehicle body 2 has been exemplified in the embodiment described above as shown in FIG. 1, the position for attaching the lateral vibration insulating member 3 is not limited to that position and may be attached to the right and left sides or to the rear side of the vehicle body 2 as long as they are regions facing to the lateral surface of the fuel tank 1. Thus, the vibration insulating quality of the lateral vibration insulating member 3 may be improved further by the arrangement described above.

What is claimed is:

1. A vibration insulating member interposed between a fuel tank that is mounted on a vehicle body by means of a tank band and the vehicle body, the vibration insulating member comprising:
   an engaging protrusion that is fixed to a fixing hole, the fixing hole being made through the vehicle body in a direction orthogonal to a direction in which the fuel tank is fastened;
   an attachment member formed integrally with the engaging protrusion; and
   a cushion member having a through hole through which the engaging protrusion is inserted, wherein:
   the attachment member has a plurality of projecting pieces, each of which projects in a direction orthogonal to the engaging protrusion and supports the cushion member,
   the cushion member being formed approximately into a disc shape, comprises:
   stepped portions, each of which engages with the projecting piece of the attachment member, and is formed to radially extend from a region around the through hole; and
   a plurality of projections, each of which is disposed between the projecting pieces formed to project radially from the region around the through hole, is formed into a convex shape projecting out of a disc plane of the cushion member, and abuts against a side surface of the fuel tank when the attachment member is combined with the cushion member.

2. The vibration insulating member according to claim 1, wherein the attachment member has an anchor portion that is anchored by an opening edge of the fixing hole when the engaging protrusion is inserted into the through hole of the cushion member and the fixing hole.

3. The vibration insulating member according to claim 1, wherein a supporting portion comprising the plurality of projecting pieces is formed to project from a base portion of the engaging protrusion toward a hem portion of the projections of the cushion member.

* * * * *